US008713607B2

(12) United States Patent
McEnroe

(10) Patent No.: US 8,713,607 B2
(45) Date of Patent: Apr. 29, 2014

(54) MULTI-ROOM USER INTERFACE

(75) Inventor: Elizabeth Rose McEnroe, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 520 days.

(21) Appl. No.: 11/241,764

(22) Filed: Sep. 30, 2005

(65) Prior Publication Data

US 2007/0079340 A1 Apr. 5, 2007

(51) Int. Cl.
*H04N 5/445* (2011.01)
*G06F 3/00* (2006.01)
*G06F 13/00* (2006.01)
*H04N 7/18* (2006.01)

(52) U.S. Cl.
USPC ............................ 725/46; 725/41; 725/78

(58) Field of Classification Search
USPC .................................................. 725/80
See application file for complete search history.

(56) References Cited

U.S. PATENT DOCUMENTS

| | | | |
|---|---|---|---|
| 6,259,443 B1* | 7/2001 | Williams, Jr. ............... | 715/741 |
| 6,757,906 B1* | 6/2004 | Look et al. .................. | 725/45 |
| 6,965,604 B1* | 11/2005 | Sato et al. .................. | 370/401 |
| 7,278,152 B1* | 10/2007 | Rao ............................ | 725/91 |
| 7,370,343 B1* | 5/2008 | Ellis ........................... | 725/58 |
| 7,458,092 B1* | 11/2008 | Parker et al. ............... | 725/120 |
| 7,757,252 B1* | 7/2010 | Agasse ........................ | 725/41 |
| 2003/0154473 A1* | 8/2003 | Shin ............................ | 725/28 |
| 2004/0031058 A1* | 2/2004 | Reisman ..................... | 725/112 |
| 2004/0068739 A1* | 4/2004 | Russ et al. .................. | 725/39 |
| 2004/0101271 A1* | 5/2004 | Boston et al. ............... | 386/46 |
| 2004/0210944 A1* | 10/2004 | Brassil et al. ............... | 725/135 |
| 2004/0251887 A1* | 12/2004 | Sparrell et al. ............. | 323/312 |
| 2005/0055716 A1* | 3/2005 | Louie et al. ................. | 725/58 |
| 2005/0155052 A1* | 7/2005 | Ostrowska et al. ......... | 725/25 |
| 2005/0166230 A1* | 7/2005 | Gaydou et al. ............. | 725/41 |
| 2005/0188406 A1* | 8/2005 | Gielow et al. .............. | 725/81 |
| 2005/0198682 A1* | 9/2005 | Wright ........................ | 725/96 |
| 2005/0235307 A1* | 10/2005 | Relan et al. ................. | 725/14 |
| 2005/0238020 A1* | 10/2005 | Hetzel et al. ............... | 370/390 |
| 2005/0289619 A1* | 12/2005 | Melby ......................... | 725/95 |
| 2006/0020971 A1* | 1/2006 | Poslinski ..................... | 725/44 |
| 2006/0075420 A1 | 4/2006 | Ludvig et al. | |
| 2006/0117354 A1* | 6/2006 | Schutte et al. .............. | 725/78 |
| 2006/0218581 A1* | 9/2006 | Ostrowska et al. ......... | 725/38 |
| 2007/0039028 A1* | 2/2007 | Bar ............................. | 725/95 |
| 2007/0044130 A1* | 2/2007 | Skoog ......................... | 725/110 |
| 2007/0079341 A1* | 4/2007 | Russ et al. .................. | 725/89 |

* cited by examiner

*Primary Examiner* — Brian T Pendleton
*Assistant Examiner* — Ryan Stronczer
(74) *Attorney, Agent, or Firm* — Micah P. Goldsmith; Glen Johnson; Micky Minhas

(57) ABSTRACT

Multi-room user interface is described. In an embodiment, a viewing system includes television-based client devices that each receive a different data stream and render a viewing selection from the data stream. A multi-room user interface displayed at a first television-based client device can display a representation of a viewing selection being shown at any one or more of the other television-based client devices.

20 Claims, 8 Drawing Sheets

MULTI-ROOM USER INTERFACE

BACKGROUND

A typical household may have four, five, or more, television viewing areas and/or rooms, many of which consumers expect to have television content provided by a cable company or similar television content provider. In an IP-based television (IPTV) system, the bandwidth available to deliver data streams to a household can restrict the number of television devices that can receive television content at any one time. For example, a household may have six televisions, only four of which can display live television for viewing at any one time.

For an IPTV system, a television-based client device does not include a physical tuner like a conventional television set-top box, for example. Rather there is a limited amount of bandwidth allocated for a viewing system, such as a household, over which all of the media content data is provided for the viewing system. Additionally, different stream formats require more bandwidth than others for delivery of the data streams. For example, standard definition data streams do not require as much bandwidth as high definition data streams. This allows more standard definition programs to be viewed at any one time than high definition programs in a multi-television environment. However this creates more complex viewing situations and conflicts for a viewing system. Multiple solutions to the conflicts are possible based on time and bandwidth conflicts between the various data streams and viewer requested actions, such as a request to view live television, a video on-demand, an audio channel, and the like via a data stream.

SUMMARY

This summary is provided to introduce simplified concepts of multi-room user interface which is further described below in the Detailed Description. This summary is not intended to identify essential features of the claimed subject matter, nor is it intended for use in determining the scope of the claimed subject matter.

In an embodiment of multi-room user interface, a viewing system includes television-based client devices that each receive a different data stream and render a viewing selection from the data stream. In one example, the viewing system is implemented in a household and each of the television-based client devices are a set-top box located in a different viewing area of the household. A multi-room user interface displayed at a first television-based client device in a room, or viewing area, of the household can display a representation of a viewing selection being shown at any one or more of the other client devices in other viewing areas of the household.

In other embodiments of multi-room user interface, a recording indicator can be displayed on the multi-room user interface to indicate that a viewing selection being shown at a television-based client device is being recorded. Additionally, the multi-room user interface can indicate a recording conflict between two or more of the client devices in a viewing system. The multi-room user interface can display recorded selections from which recorded media content can be selected for viewing, and indicate that a data stream being directed to a client device can be redirected via the multi-room user interface to the client device where the multi-room user interface is being displayed.

BRIEF DESCRIPTION OF THE DRAWINGS

The same numbers are used throughout the drawings to reference like features and components.

DETAILED DESCRIPTION

Multi-room user interface is described in which embodiments for an IP-based television (IPTV) system provide a viewer with recording information, recording conflict information, and program viewing information for any one or more television-based client devices in a viewing system, such as a household that has several televisions. A multi-room user interface can be initiated from any of the client devices in the viewing system of the household, and can display what is being recorded and/or shown for viewing on each television of the viewing system to inform a viewer of current or possible future bandwidth conflicts which allows the viewer to select conflict solution(s). Further, a multi-room user interface provides that a viewer's television experience can start from the multi-room user interface when a television (or display device) is initially turned on for viewing, rather than simply displaying live television and/or the last channel displayed before the system was turned off.

Additionally, the multi-room user interface informs the viewer as to which data streams can be redirected for viewing, and which data streams are currently being utilized for viewing selections and/or recordings in other viewing areas of the viewing system. If a viewer tries to select a new program to watch, the new program is shown if bandwidth permits and if a data stream is available. If not, the multi-room user interface can display options for the viewer, such as canceling a recording on another television, redirecting a data stream from another viewing area, turning off an unwatched television, selecting a recorded program or video on-demand to watch, and the like. Further, the viewer can determine what others in the household are watching and then choose to join another viewer in a different viewing area of the house to watch something of interest.

While aspects of the described systems and methods for multi-room user interface can be implemented in any number of different computing systems, environments, television-based entertainment systems, and/or configurations, embodiments of multi-room user interface are described in the context of the following exemplary system architectures.

Figure 1:
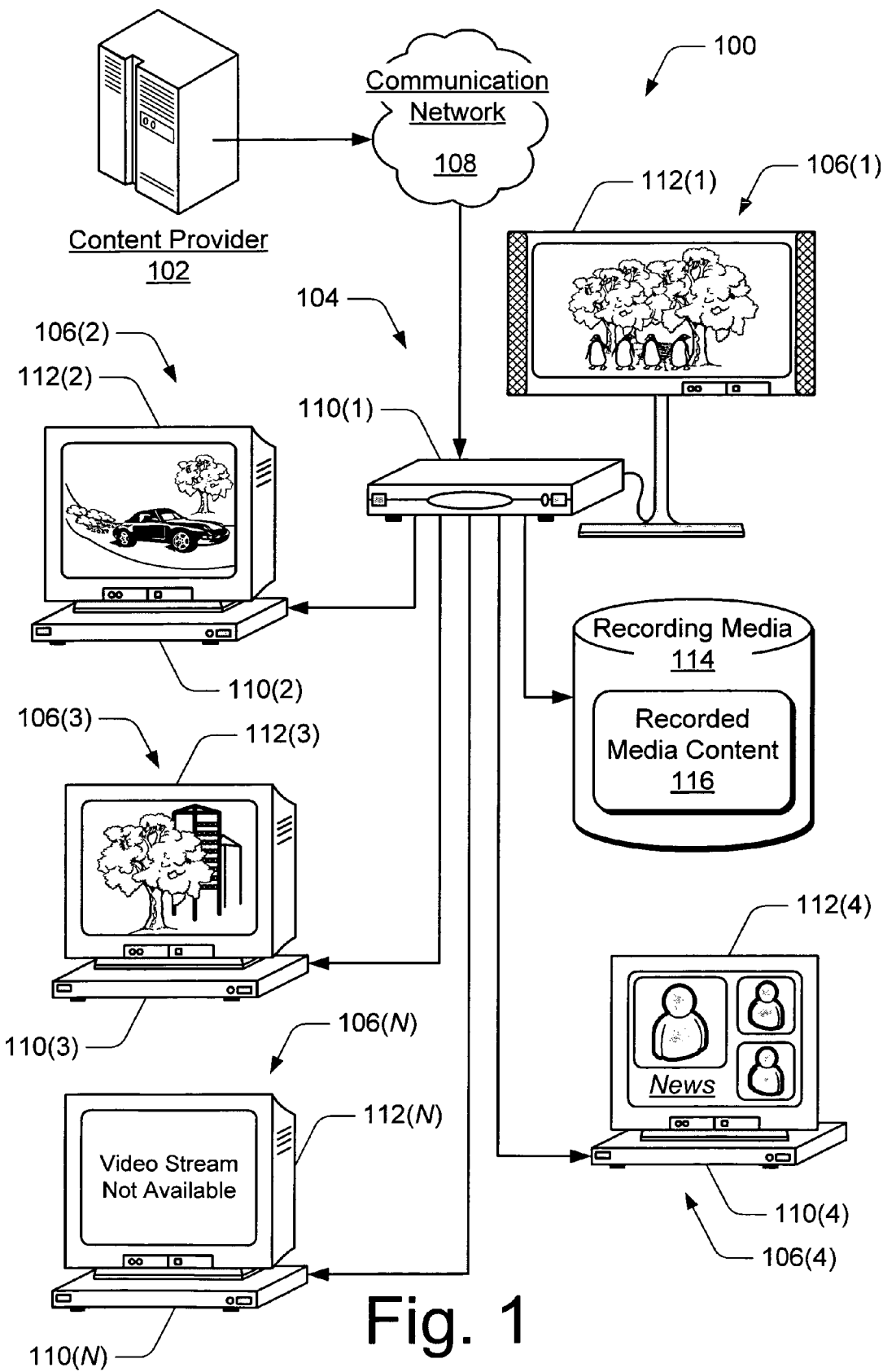
FIG. 1 illustrates an exemplary IP-based television (IPTV) system in which embodiments of multi-room user interface can be implemented.

FIG. 1 illustrates an exemplary IP-based television (IPTV) environment 100 in which embodiments of multi-room user interface can be implemented. The IPTV environment 100 includes a content provider 102 and a viewing system 104 that can include any number of television-based client systems 106. A client system 106(1) is configured for communication with the content provider 102 via a communication network 108 which, in this example, is an IP-based network. In addition to the client system 106(1), the viewing system 104 includes television-based client systems 106(2-N), and can represent a household viewing system that has several viewing areas, such as different rooms, for viewing television programming. Television-based programs may include any form of programs, commercials, music, movies, video on-demand movies and other media content, recorded media content, interactive games, network-based applications, and any other similar audio, video, and/or image content.

The television-based client systems 106(1-N) may be implemented with any number and combination of differing components as further described below with reference to the exemplary client device 1000 shown in FIG. 10. Further, the IPTV environment 100 may be implemented with any number and combination of differing components as described below with reference to the exemplary entertainment and information system 1100 shown in FIG. 11.

The television-based client system 106(1) includes a client device 110(1) and a display device 112(1), such as any type of television, monitor, or similar television-based display system that renders audio, video, and/or image data. Similarly, the television-based client systems 106(2-N) each include a respective client device 110(2-N) and a respective display device 112(2-N). Each client device 110 can be implemented in any number of embodiments, such as a set-top box, a digital video recorder (DVR) and playback system, a personal video recorder (PVR), an appliance device, and as any other type of client device that may be implemented in a television-based entertainment and information system.

Client device 110(1) receives program content from content provider 102 via the communication network 108. In the example viewing system 104, client device 110(1) is a master client device that receives one or more data streams from content provider 102 and then arbitrates stream allocation to distribute the data streams, one each, to one or more of the other satellite client devices 110(2-N). The satellite client devices 110(2-N) connect to the master client device 110(1) to receive a data stream for live television, delayed program viewing, or recorded DVR playback. The data streams are allocated by the content provider to the viewing system 104 (e.g., a household), and the data streams can be any combination of high definition and/or standard definition television data streams. For example, the viewing system 104 may receive one high definition data stream and three standard definition data streams depending upon available bandwidth to deliver the data streams. As more bandwidth becomes available, a viewing system may receive more high definition and/or standard definition data streams.

Although the data streams are not shown specifically, the arrowed communication links illustrate various data communication links which include the data streams. Additionally, the arrowed communication links are not intended to be interpreted as a one-way communication link from client device 110(1) to client device 110(2), for example. It is contemplated that any one or more of the arrowed communication links can facilitate two-way data communication, such as from client device 110(2) to client device 110(1) for example, and from client device 110(1) to content provider 102.

In this system, the master client device 110(1) receives four (4) data streams from the content provider 102 via the communication network 108. A viewing selection from a first data stream is shown for viewing on display device 112(1) at the television-based client system 106(1). A second data stream is directed from the master client device 110(1) to the television-based client system 106(2) and a viewing selection from a second data stream is shown for viewing on display device 112(2). Similarly, a third data stream is directed from the master client device 110(1) to the television-based client system 106(3) and a viewing selection from the third data stream is shown for viewing on display device 112(3). Additionally, a fourth data stream is directed from the master client device 110(1) to the television-based client system 106(4) and a viewing selection from the fourth data stream is shown for viewing on display device 112(4).

The available bandwidth for a viewing system, or household as in this example, may not be able to accommodate as many data streams as there are client devices. It is not unusual for a household to have five (5) or more televisions in various rooms and at various locations throughout the house. In this system, the number of client devices exceeds the number of data streams allocated to the viewing system 104 from the content provider 102. For example, the viewing system 104 includes at least a fifth satellite client device 110(N) of the television-based client system 106(N). The corresponding display device 112(N) indicates that no video stream is available because the four (4) data streams allocated to the viewing system 104 are already being directed to the other client devices 110(1-4). In an embodiment, the content provider 102 may allow a viewer at the television-based client system 106(N) to obtain (e.g., purchase or otherwise acquire) another data stream if the four allotted data streams for the viewing system 104 are currently in use, or are otherwise not available. In this example, the content provider 102 may provision a fifth data stream along with a buffer allowance for the duration of a video on-demand movie, or other program that the viewer wants to watch.

The viewing system 104 also includes recording media 114 which can be implemented as a DVR system to record and maintain media content 116, such as any form of programs, movies, and similar audio, video, and/or image content that may be distributed or otherwise received from content provider 102. In one embodiment, the recording media can be implemented as an independent component of the viewing system 104 and connected to the master client device 110(1). Alternatively, the recording media 114 can be implemented as a component of the master client device 110(1) which manages recordings initiated from any of the other satellite client devices 110(2-N). In yet another embodiment, the recording media 114 may be a distributed recording system where any one or more of the client devices 110(1-N) include recording media that is centrally managed by the master client device 110(1).

Figure 2:
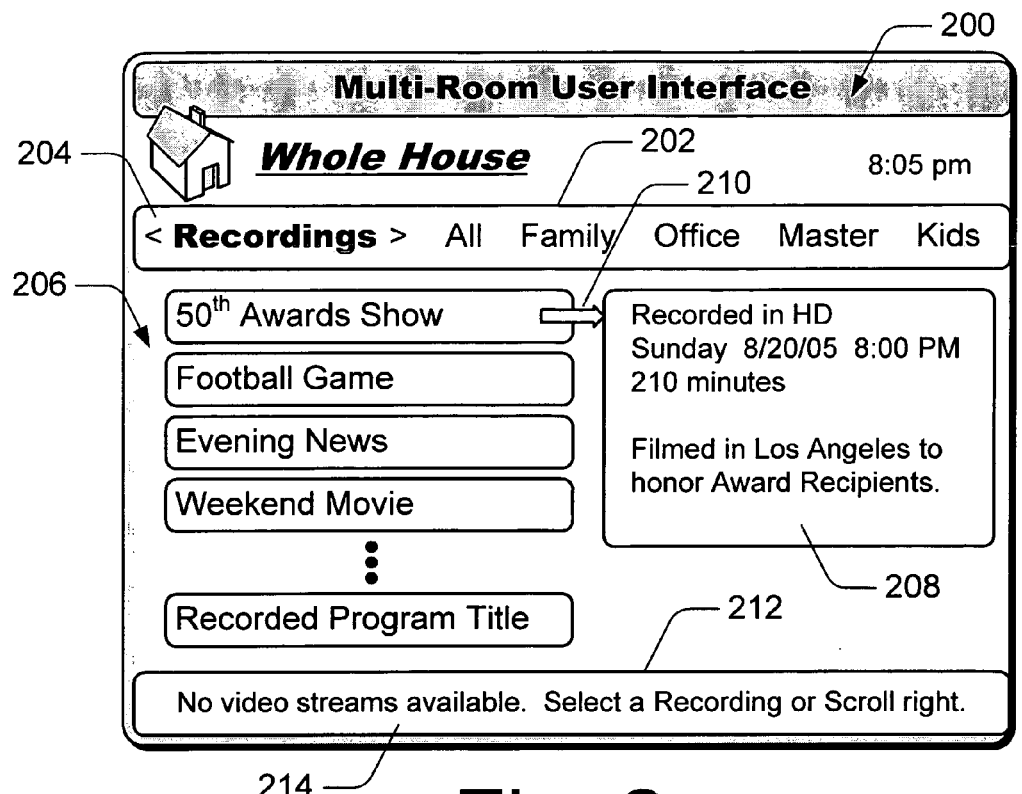
FIG. 2 illustrates an exemplary multi-room user interface in an embodiment of multi-room user interface.

FIG. 2 illustrates an exemplary multi-room user interface 200 which may be initiated from any of the client devices 110(1-N) and displayed on the respective display devices 112(1-N) of the viewing system 100 shown in FIG. 1. The multi-room user interface 200 can be selected from a program guide menu, or other main menu, at a client device 110, or can be implemented to display when a bandwidth conflict occurs. The multi-room user interface described with reference to FIGS. 2-8 can provide a viewer with recording information, recording conflict information, and program viewing information for all of the television-based client systems 106(1-N) of the viewing system 104 shown in FIG. 1. The multi-room user interface can display what is being recorded and/or shown for viewing on each display device 112(1-N), and inform a viewer of current or possible future bandwidth conflicts which allows the viewer to select conflict solution(s).

In this example, the multi-room user interface 200 indicates that the viewing system 104 is a household which is labeled "Whole House" on the user interface. The multi-room user interface 200 includes a scroll of selectable identifiers 202 from which any of the client devices 110(1-N) can be selected in addition to a recordings selection 204. In the examples of the multi-room user interface described with reference to FIGS. 2-8, the selectable identifiers 202 include a "Family" identifier which indicates that the television-based client system 106(1) is located in a family room of the household (i.e., viewing system 104). Similarly, an "Office" identifier indicates that the television-based client system 106(4) is located in an office of the household, a "Master" identifier indicates that the television-based client system 106(3) is located in a master bedroom of the household, and a "Kids" identifier indicates that the television-based client system 106(2) is located in a kid's viewing area of the household.

The multi-room user interface 200 indicates that the "Recordings" selectable identifier 204 is selected and correspondingly displays recorded selections 206 from which recorded media content 116 (FIG. 1) can be selected for viewing. The multi-room user interface 200 also includes a description 208 of a selected recording 210. The description 208 indicates that the program (i.e., selected recording 210) was recorded in high definition, identifies when the program was recorded, and a time duration of the program.

The multi-room user interface 200 also displays an information field 212 to further inform the viewer of a status 214 of the viewing system 104 (FIG. 1). In this example, the multi-room user interface 200 is initiated from the fifth satellite client device 110(N) of the television-based client system 106(N). As shown in FIG. 1, the corresponding display device 112(N) indicates that no video stream is available because the four (4) data streams allocated to the viewing system 104 are already being directed to the other client devices 110(1-4). As such, the multi-room user interface 200 offers alternative viewing by way of the recorded selections 206, any of which can be selected for viewing on display device 112(N) without taking a data stream from another of the client devices 110 (1-4).

In an embodiment, a multi-room user interface provides that a viewer's television experience can start from the multi-room user interface when a television (or display device) is initially turned on for viewing, rather than simply displaying live television and/or the last channel displayed before the system was turned off. Additionally, the various examples and displays on the multi-room user interface 200 described with reference to FIGS. 2-8 are merely exemplary to illustrate features and embodiments of multi-room user interface. Accordingly, any of the examples of the multi-room user interface may include any type of displays in the form of video, image, text, audio, and/or a combination thereof.

Figure 3:
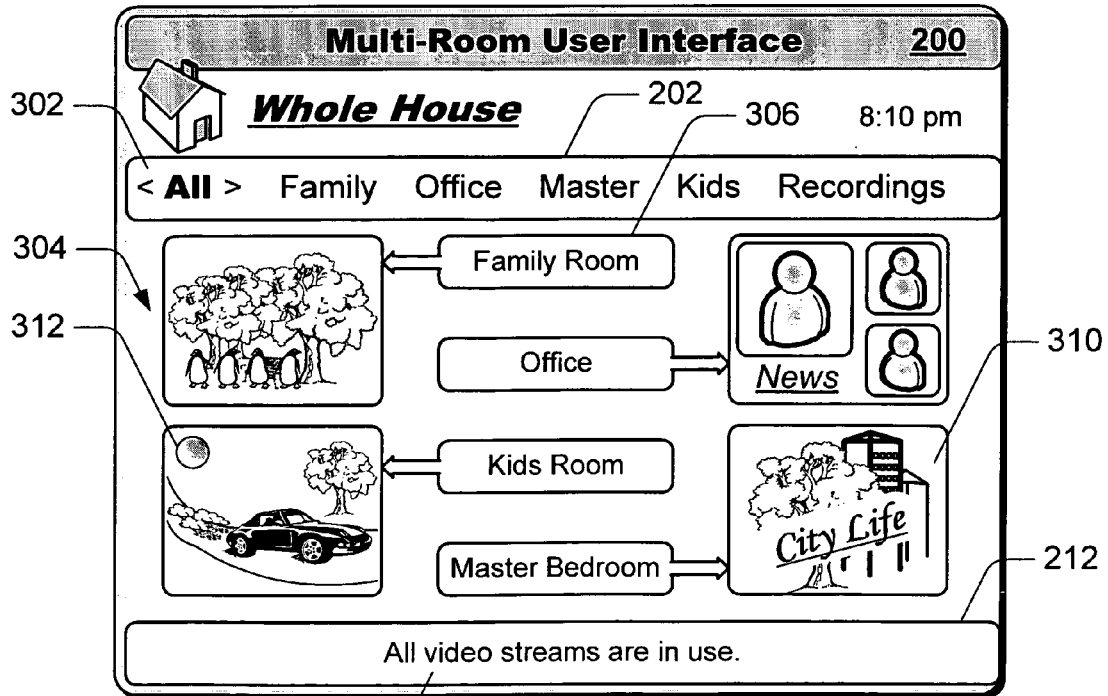
FIGS. 3-8 illustrate example displays of the multi-room user interface in various embodiments of multi-room user interface.

FIG. 3 illustrates an exemplary display 300 of the multi-room user interface 200. The scroll of selectable identifiers 202 includes an "All" selection 302 and the multi-room user interface 200 displays representations 304 of the viewing selections being shown at all of the client devices 110(1-N) that receive a different data stream. The multi-room user interface 300 also includes household viewing area identifiers 306 to identify which representations 304 correspond to the viewing selections being shown on the display devices 112 (1-N) of the television-based client systems 106(1-N). The multi-room user interface 200 also displays the information field 212 to further inform the viewer of a status 308 of the viewing system 104, which in this example indicates that all of the video streams are in use.

In an embodiment, the representations 304 of the viewing selections are PIP (picture-in-picture) data streams which are received from the content provider 102 in addition to the data streams that are received at the master client device 110(1). In alternate embodiment(s), the representations 304 of the viewing selections can be any type of video, text, and/or image content that identifies the viewing selections being shown on the display devices 112(1-N) of the television-based client systems 106(1-N). For example, a representation 310 of the viewing selection being shown in the master bedroom of the household is a poster image of on-demand media content. A viewer may prefer to see only the poster image of an on-demand movie, for example, so as not to see a part of the movie before having an opportunity to watch the movie from the beginning.

The multi-room user interface 200 also displays a recording indicator 312 to indicate that the viewing selection being shown in the kid's viewing area of the household is being recorded. The illustrated recording indicator 312 is merely exemplary, and any type of text, graphic, or image can be displayed to inform a viewer that the viewing selection should not be discontinued or redirected so as to continue recording the viewing selection.

Figure 4:
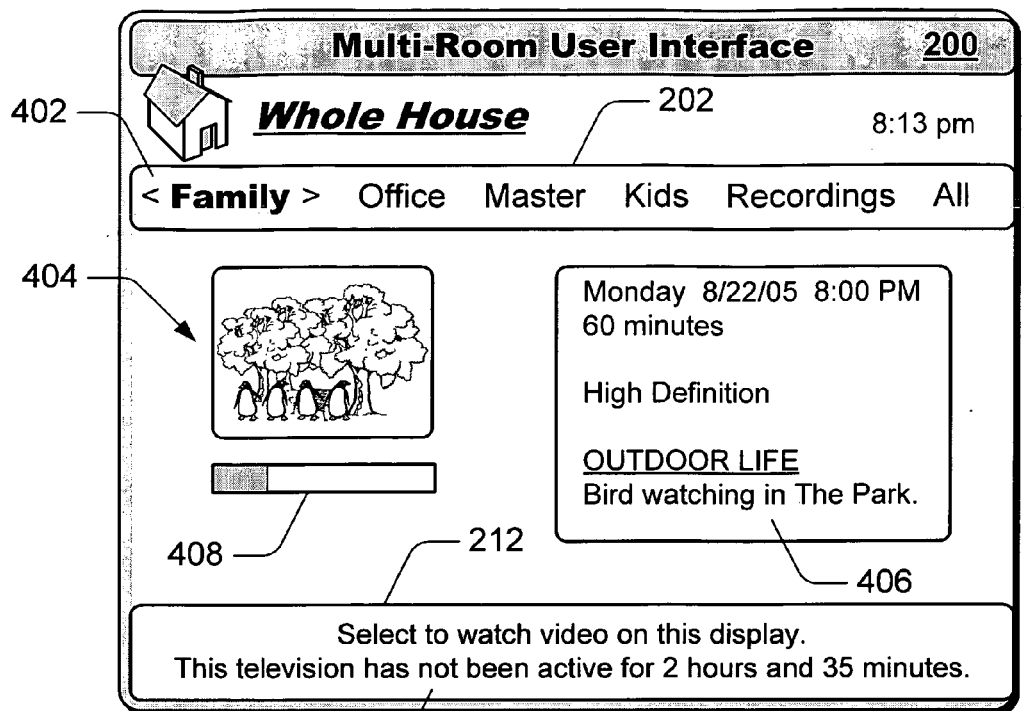

FIG. 4 illustrates an exemplary display 400 of the multi-room user interface 200. The scroll of selectable identifiers 202 indicates that the "Family" selectable identifier 402 is selected, and the multi-room user interface 200 correspondingly displays a representation 404 of the viewing selection being shown on the display device 112(1) of the television-based client system 106(1). The multi-room user interface 200 includes a description 406 of the viewing selection being shown in the family room of the household.

The multi-room user interface 200 also includes a progress bar 408, or indicator, to indicate an amount of the program that has been broadcast or delivered for viewing in the family room of the household. In this example, the current time is identified as 8:13 p.m. on the multi-room user interface and the description 406 of the viewing selection indicates that the program started at 8:00 p.m. and has a time duration of sixty (60) minutes. Accordingly, the progress bar 408 indicates that approximately twenty-five (25) percent, or one-quarter, of the program's time duration has elapsed. In an alternate embodiment, the progress bar 408 can be implemented to indicate the time remaining for a program.

The multi-room user interface 200 also displays the information field 212 to inform the viewer with a message 410 that the data stream being directed to the television-based client system 106(1) can be redirected to the television-based client system where the multi-room user interface 200 is being displayed. For example, a viewer can initiate the multi-room user interface 200 from the fifth satellite client device 110(N) of the television-based client system 106(N) and select to have the data stream redirected from the client device 110(1) to the client device 110(N). In this example, the message 410 in the message information field 212 also informs the viewer that the television in the family room has not been active for the past two hours and thirty-five minutes. For example, the channel has not been changed, the volume has not been adjusted, and/or any other type of viewer input that may indicate someone is watching the television in the selected viewing area of the household. This provides additional information on which to make a determination as to whether to redirect the data stream to a different client device 110.

Figure 5:
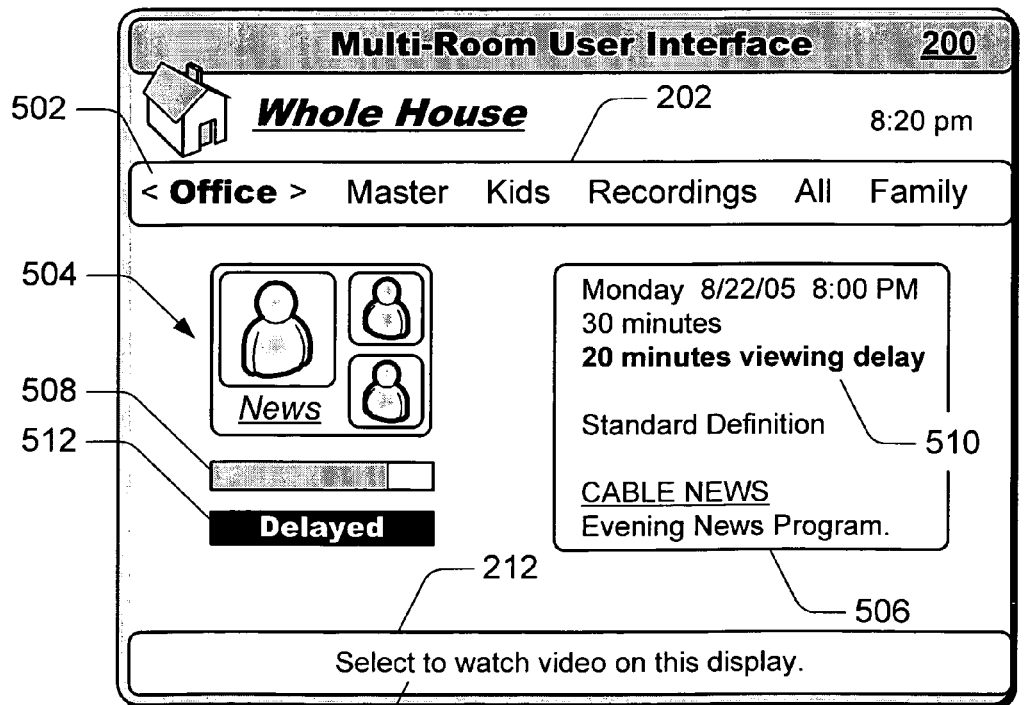

FIG. 5 illustrates an example display 500 of the multi-room user interface 200. The scroll of selectable identifiers 202 indicates that the "Office" selectable identifier 502 is selected, and the multi-room user interface 200 correspondingly displays a representation 504 of the viewing selection being shown on the display device 112(4) of the television-based client system 106(4). The multi-room user interface 200 includes a description 506 of the viewing selection being shown in the office of the household, and includes a progress bar 508 to indicate an amount of the program that has been broadcast or delivered for viewing.

The description 506 of the viewing selection indicates that the program started at 8:00 p.m. and has a time duration of thirty (30) minutes. The description 506 also indicates that the program is being viewed on a twenty (20) minute delay at 510 to inform the viewer that the program is being viewed from a pause buffer and is not being watched in real-time. Alternatively, or in addition, a delayed viewing indicator 512 can be displayed on the multi-room user interface 200 to further inform the viewer that the program is being viewed on a time delay. This also provides additional information on which to make a determination as to whether to redirect the data stream to a different client device 110. The multi-room user interface 200 also displays the information field 212 to inform the viewer with a message 514 that the data stream being directed to the television-based client system 106(4) can be redirected to the television-based client system where the multi-room user interface 200 is being displayed.

Figure 6:
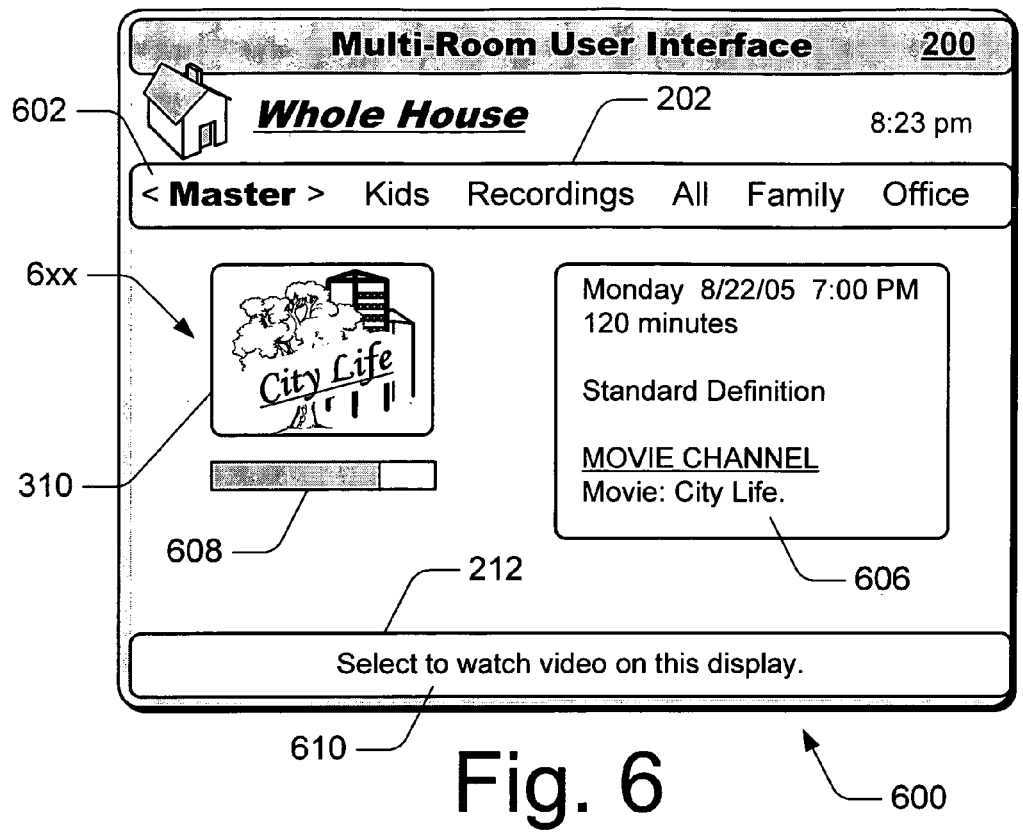

FIG. 6 illustrates an example display 600 of the multi-room user interface 200. The scroll of selectable identifiers 202 indicates that the "Master" selectable identifier 602 is selected, and the multi-room user interface 200 correspondingly displays a representation 604 of the viewing selection being shown on the display device 112(3) of the television-based client system 106(3). In this example, the representation 604 of the viewing selection is the poster image 310 of the viewing selection.

The multi-room user interface 200 includes a description 606 of the viewing selection being shown in the master bedroom of the household, and includes a progress bar 608 to indicate a time duration of the viewing selection (e.g., video on-demand movie in this example). The multi-room user interface 200 also displays the information field 212 to inform the viewer with a message 610 that the data stream being directed to the television-based client system 106(3) can be redirected to the television-based client system where the multi-room user interface 200 is being displayed.

Figure 7:
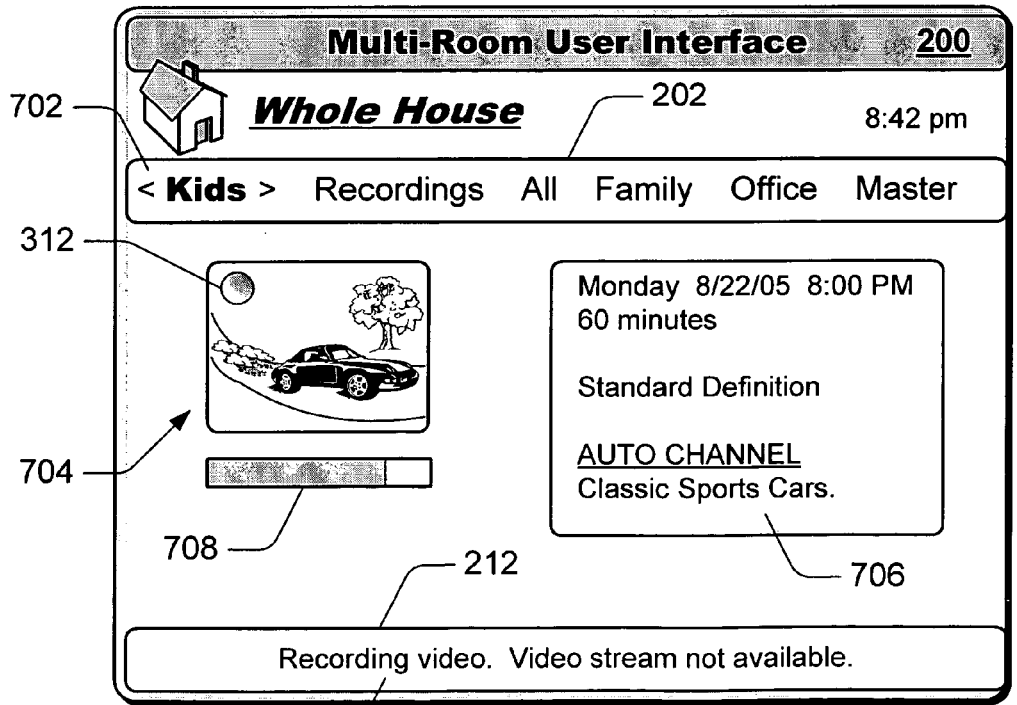

FIG. 7 illustrates an example display 700 of the multi-room user interface 200. The scroll of selectable identifiers 202 indicates that the "Kids" selectable identifier 702 is selected, and the multi-room user interface 200 correspondingly displays a representation 704 of the viewing selection being shown on the display device 112(2) of the television-based client system 106(2). In this example, the multi-room user interface 200 also displays the recording indicator 312 to indicate that the viewing selection being shown in the kid's viewing area of the household is being recorded.

The multi-room user interface 200 includes a description 706 of the viewing selection being shown in the kid's viewing area of the household, and includes a progress bar 708 to indicate a time duration of the recording of the viewing selection. The multi-room user interface 200 also displays the information field 212 to inform the viewer with a message 710 that the data stream being directed to the television-based client system 106(2) is being recorded and is not available to be redirected. Alternatively, a viewer can be provided the option to discontinue the recording at the television-based client system 106(2) and have the data stream redirected to the television-based client system where the multi-room user interface 200 is being displayed.

Figure 8:
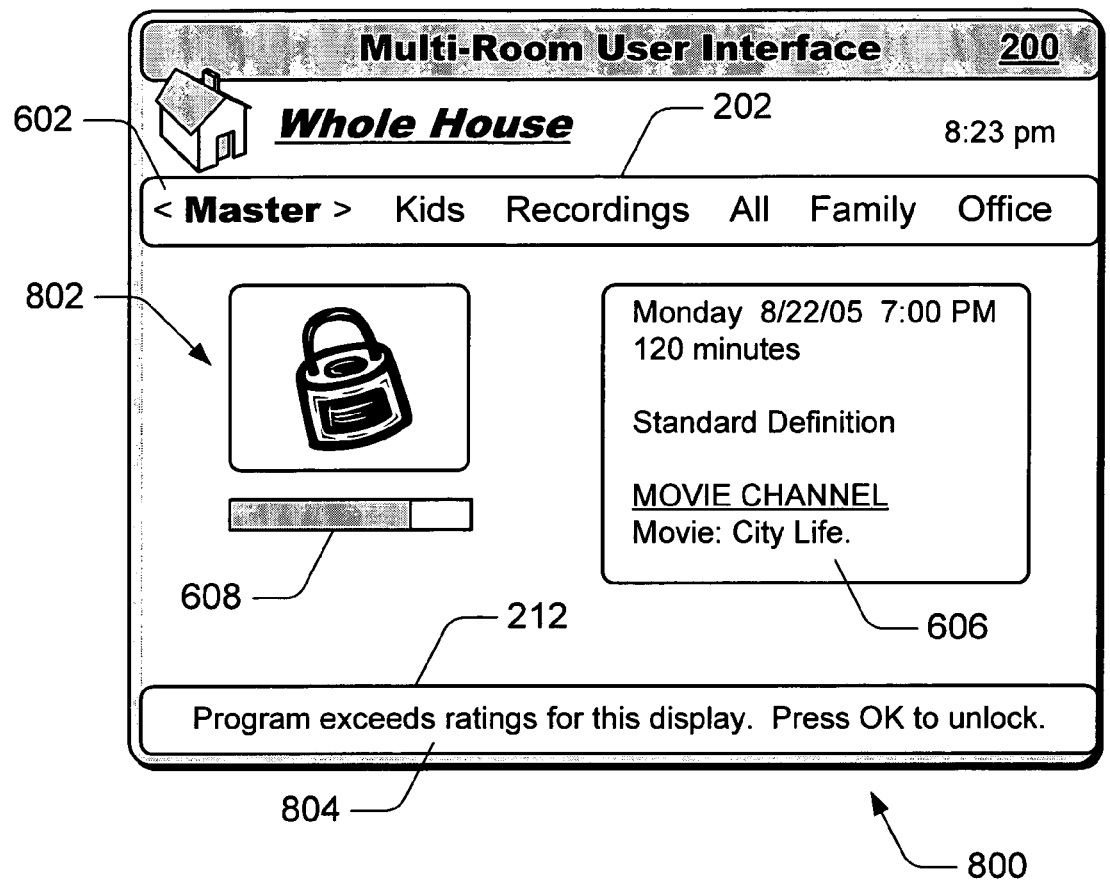

FIG. 8 illustrates an example display 800 of the multi-room user interface 200. In this example, the multi-room user interface 200 is initiated at the client device 110(2) in the kid's viewing area of the household, and the scroll of selectable identifiers 202 indicates that the "Master" selectable identifier 602 is selected. Instead of a representation of the viewing selection that is being shown in the master bedroom being displayed on the multi-room user interface 200, the viewing selection is preempted from display and a viewing control indicator 802 is displayed. The viewing control indicator 802 indicates that the viewing selection being shown in the master bedroom exceeds a viewing control limit, such as a parental control setting, of the client device 110(2) in the kid's viewing area of the household. The multi-room user interface 200 also displays the information field 212 to inform the viewer with a message 804 that the program exceeds ratings for the display in the kid's viewing area. Optionally, the viewer can unlock the parental control (or other viewing control limit) from the multi-room user interface 200 with a code (if known) entered at the client device 110(2) in the kid's viewing area.

The multi-room user interface 200 can be utilized throughout a household (i.e., viewing system 104) to monitor what others may be watching in different viewing areas of the household, particularly in a child's room. In an embodiment, a multi-room user interface can be implemented as a parental monitor to display what is being shown in another viewing area when the viewing selection in the other area changes. For example, a parent in the master bedroom of the household at the television-based client system 106(3) may initiate that the multi-room user interface 200 display the viewing selection in the kid's viewing area at the television-based client system 106(2) when the viewing selection changes. The parent can then be informed as to the child's viewing selection without having to enter the kid's viewing area of the household.

In an embodiment, a parent may also be able to remotely unlock a viewing selection at one client device 110 from another of the client devices. For example, if a multi-room user interface 200 is displayed in the master bedroom of the household at the television-based client system 106(3), and the display indicates that the viewing selection in the kid's viewing area at the television-based client system 106(2) is locked, the parent can selectively unlock the viewing selection in the kid's viewing area from the client device 110(3) in the master bedroom.

Methods for multi-room user interface, such as exemplary method 900 described with reference to FIG. 9, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 9:
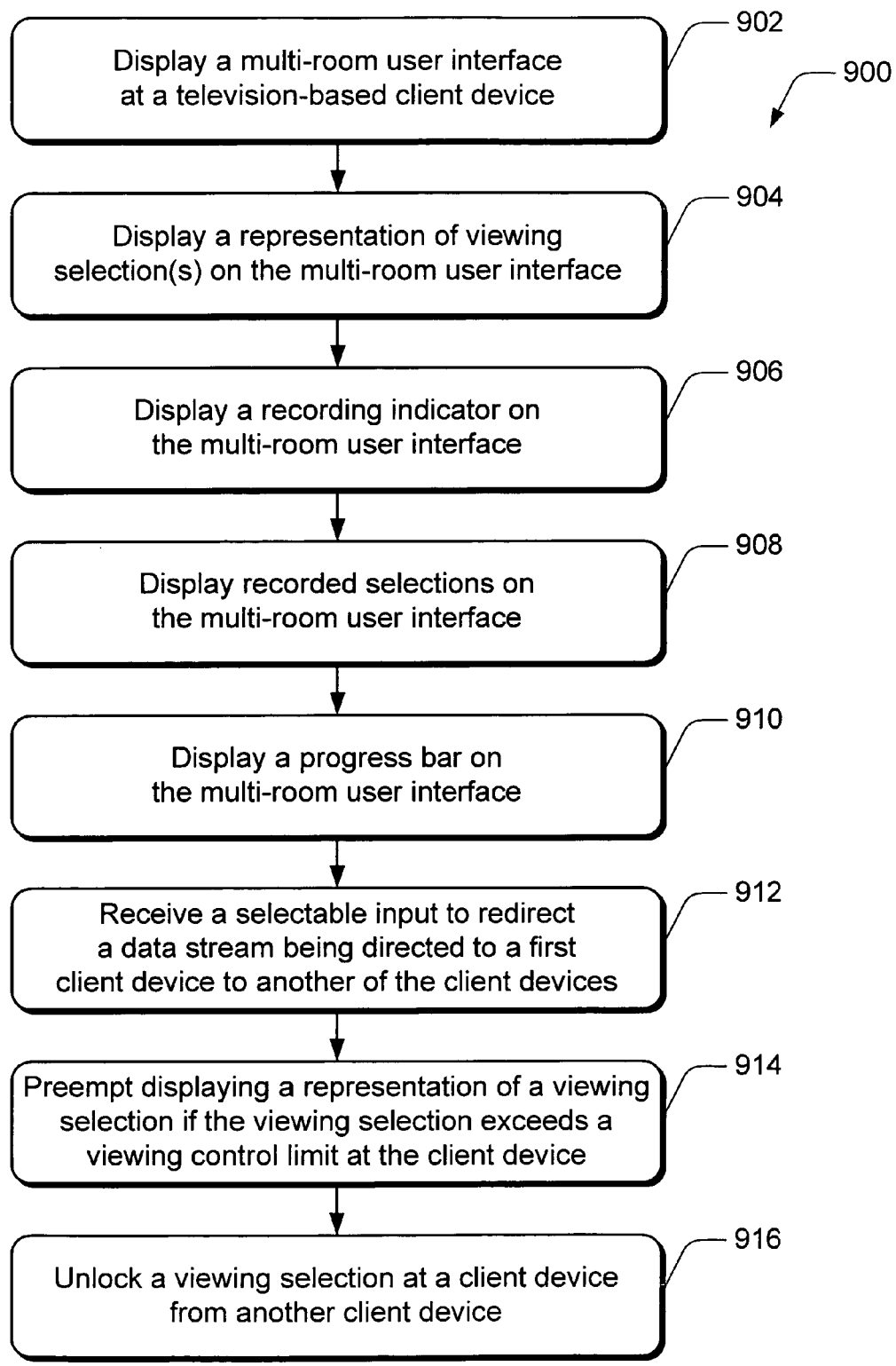
FIG. 9 illustrates an exemplary method for multi-room user interface.

FIG. 9 illustrates an exemplary method 900 for multi-room user interface. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 902, a multi-room user interface is displayed at a television-based client device. For example, the multi-room user interface 200 can be initiated from any of the client devices 110(1-N) and displayed on the respective display devices 112(1-N) of the viewing system 100 shown in FIG. 1. At block 904, a representation of viewing selection(s) are displayed on the multi-room user interface. Viewing selections being shown at any one or more of the other television-based client systems 106(1-N) can be displayed on the multi-room user interface 200. For example, the exemplary display 300 of the multi-room user interface 200 (FIG. 3) displays representations 304 of the viewing selections being shown at all of the client devices 110(1-N) that each receive a different data stream. The exemplary display 400 of the multi-room user interface 200 (FIG. 4) illustrates a single representation 404 of the viewing selection being shown on the display device 112(1) of the television-based client system 106(1).

At block 906, a recording indicator is displayed on the multi-room user interface. For example, a recording indicator 312 (FIG. 3) is displayed on the multi-room user interface 200 to indicate that a viewing selection being shown at a television-based client system is being recorded. At block 908, recorded selections are displayed on the multi-room user interface. For example, recorded selections 206 (FIG. 2) are displayed on the multi-room user interface 200. At block 910, a progress bar is displayed on the multi-room user interface that indicates a time duration of the viewing selection being shown at the client device. For example, the multi-room user interface 200 displays a progress bar 408 (FIG. 4) to indicate an amount of the program being shown in a viewing area of the viewing system 104 that has been broadcast or delivered for viewing.

At block 912, a selectable input is received via the multi-room user interface to redirect a data stream being directed to a first television-based client device to another of the television-based client devices. For example, the multi-room user interface 200 displays a message 410 (FIG. 4) that the data stream being directed to a first television-based client system can be redirected to the television-based client system where the multi-room user interface 200 is being displayed such that the viewing selection being displayed at the first television-based client device is displayed at the other television-based client device.

At block 914, a display of the representation of the viewing selection being shown at a client device is preempted if the viewing selection exceeds a viewing control limit where the multi-room user interface is displayed. For example, a viewing selection on the multi-room user interface 200 is preempted from display and a viewing control indicator 802 (FIG. 8) is displayed to indicate that the viewing selection being shown at the client device exceeds a viewing control limit, such as a parental control setting. At block 916, the viewing selection at a client device is unlocked for viewing in an event that the viewing selection exceeds a viewing control limit at the client device. For example, a viewing selection can be remotely unlocked at one client device 110 from another of the client devices.

Figure 10:
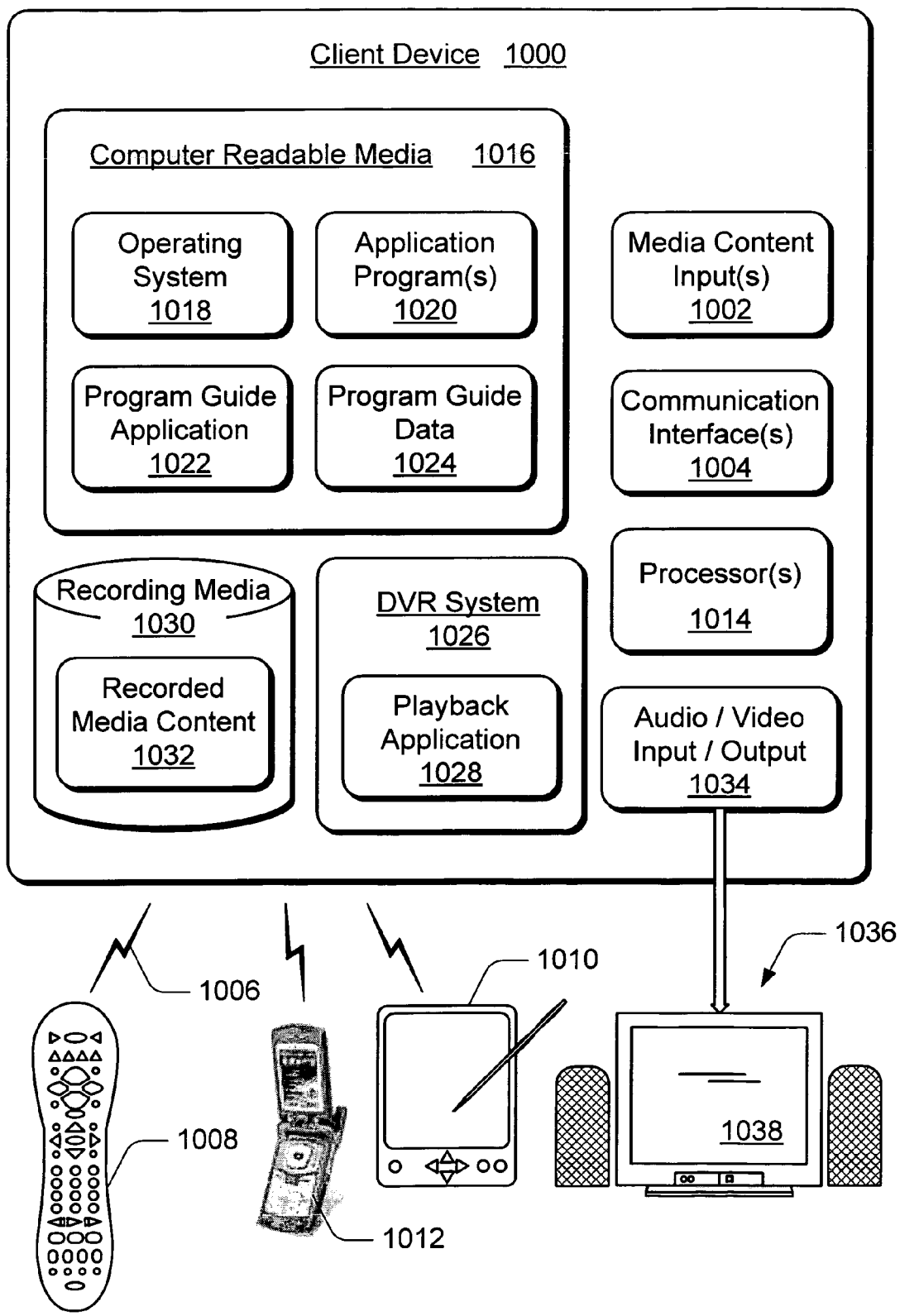
FIG. 10 illustrates various components of an exemplary client device in which embodiments of multi-room user interface can be implemented.

FIG. 10 illustrates various components of an exemplary client device 1000 which can be implemented as any form of a computing, electronic, and/or television-based client device, and in which embodiments of multi-room user interface can be implemented. For example, the client device 1000 can be implemented as the television-based client devices 110(1-N) shown in FIG. 1 as part of the viewing system 104.

Client device 1000 includes one or more media content inputs 1002 which may include Internet Protocol (IP) inputs over which streams of media content are received via an IP-based network. Device 1000 further includes communication interface(s) 1004 which can be implemented as any one or more of a serial and/or parallel interface, a wireless interface, any type of network interface, a modem, and as any other type of communication interface. A wireless interface enables client device 1000 to receive control input commands 1006 and other information from an input device, such as from remote control device 1008, PDA (personal digital assistant) 1010, cellular phone 1012, or from another infrared (IR), 802.11, Bluetooth, or similar RF input device.

A network interface provides a connection between the client device 1000 and a communication network by which other electronic and computing devices can communicate data with device 1000. Similarly, a serial and/or parallel interface provides for data communication directly between client device 1000 and the other electronic or computing devices. A modem facilitates client device 1000 communication with other electronic and computing devices via a conventional telephone line, a DSL connection, cable, and/or other type of connection.

Client device 1000 also includes one or more processors 1014 (e.g., any of microprocessors, controllers, and the like) which process various computer executable instructions to control the operation of device 1000, to communicate with other electronic and computing devices, and to implement embodiments of multi-room user interface. Client device 1000 can be implemented with computer readable media 1016, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 1016 provides data storage mechanisms to store various information and/or data such as software applications and any other types of information and data related to operational aspects of client device 1000. For example, an operating system 1018 and/or other application programs 1020 can be maintained as software applications with the computer readable media 1016 and executed on processor(s) 1014 to implement embodiments of multi-room user interface.

For example, client device 1000 can be implemented to include a program guide application 1022 that is implemented to process program guide data 1024 and generate program guides for display which enable a viewer to navigate through an onscreen display and locate broadcast programs, recorded programs, video on-demand programs and movies, interactive game selections, network-based applications, and other media access information or content of interest to the viewer. The application programs 1020 can include a programmed application to implement features and embodiments of multi-room user interface as described herein. Alternatively, the programmed application can be implemented as an integrated module or component of the program guide application 1022 to implement embodiments of multi-room user interface. The client device 1000 can also include a DVR system 1026 with playback application 1028, and recording media 1030 to maintain recorded media content 1032.

The client device 1000 also includes an audio and/or video output 1034 that provides audio and video to an audio rendering and/or display system 1036, or to other devices that process, display, and/or otherwise render audio, video, and image data. Video signals and audio signals can be communicated from device 1000 to a television 1038 (or to other types of display devices) via an RF (radio frequency) link, S-video link, composite video link, component video link, analog audio connection, or other similar communication link.

Figure 11:
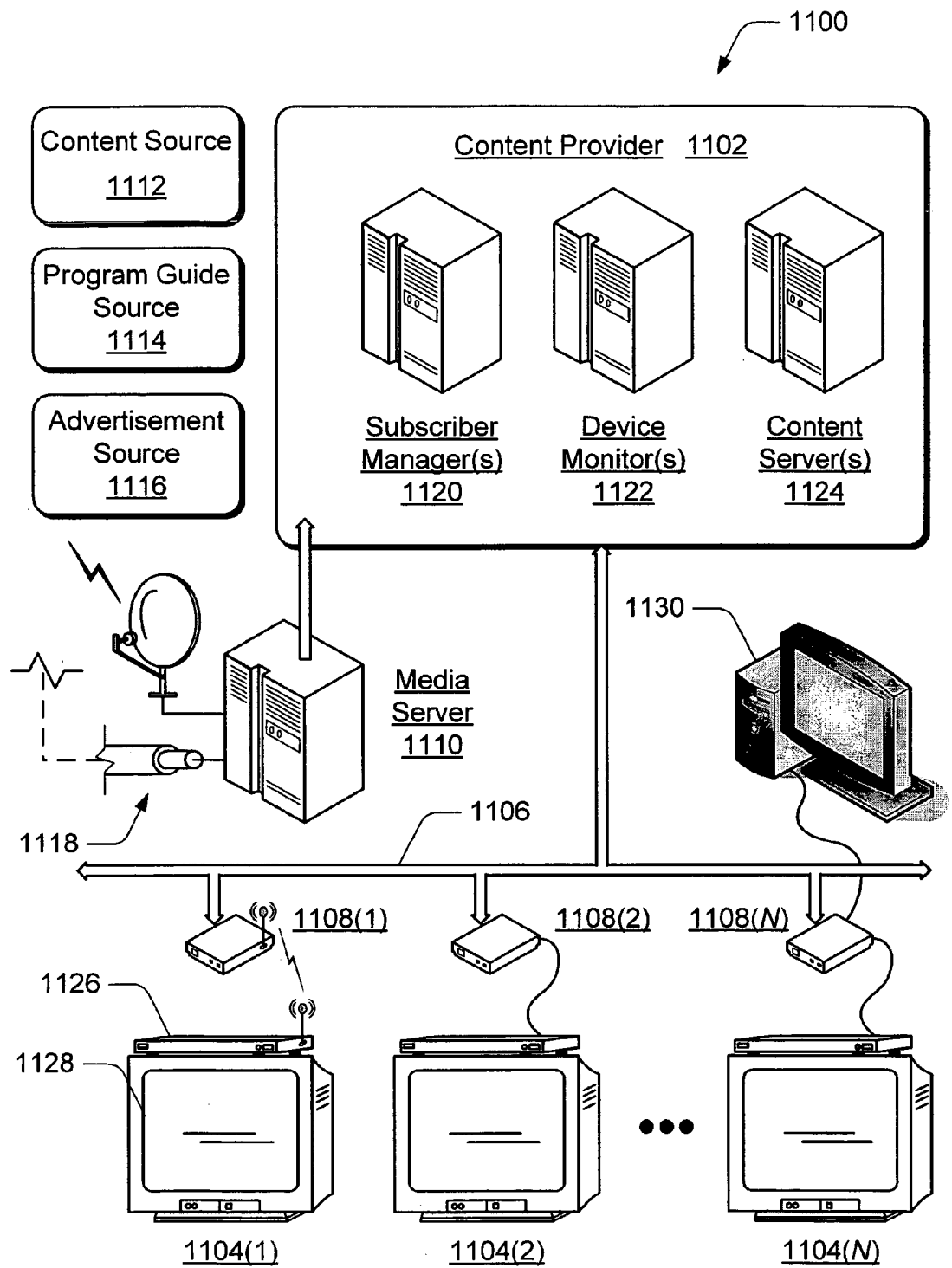
FIG. 11 illustrates various devices and components in an exemplary entertainment and information system in which embodiments of multi-room user interface can be implemented.

FIG. 11 illustrates an exemplary entertainment and information system 1100 in which an IP-based television environment can be implemented, and in which embodiments of multi-room user interface can be implemented. System 1100 facilitates the distribution of program content, program guide data, and advertising content to multiple viewers and to multiple viewing systems. System 1100 includes a content provider 1102 and television-based client systems 1104(1-N) each configured for communication via an IP-based network 1106. Each television-based client system 1104(1-N) is an example of the television-based client system 106(1) described with reference to FIG. 1. Each of the television-based client systems 1104(1-N) can receive one or more data streams from content provider 102 and then arbitrate stream allocation to distribute the data streams, one each, to one or more other satellite client devices in a viewing system.

The network 1106 can be implemented as a wide area network (e.g., the Internet), an intranet, a Digital Subscriber Line (DSL) network infrastructure, or as a point-to-point coupling infrastructure. Additionally, network 1106 can be implemented using any type of network topology and any network communication protocol, and can be represented or otherwise implemented as a combination of two or more networks. A digital network can include various hardwired and/or wireless links 1108(1-N), routers, gateways, and so on to facilitate communication between content provider 1102 and the client systems 1104(1-N). The television-based client systems 1104(1-N) receive program content, program guide data, advertising content, closed captions data, and the like from content server(s) of the content provider 1102 via the IP-based network 1106.

System 1100 includes a media server 1110 that receives program content from a content source 1112, program guide data from a program guide source 1114, and advertising content from an advertisement source 1116. In an embodiment, the media server 1110 represents an acquisition server that receives the audio and video program content from content source 1112, an EPG server that receives the program guide data from program guide source 1114, and/or an advertising management server that receives the advertising content from the advertisement source 1116.

The content source 1112, the program guide source 1114, and the advertisement source 1116 control distribution of the program content, the program guide data, and the advertising content to the media server 1110 and/or to other television-based servers. The program content, program guide data, and advertising content is distributed via various transmission media 1118, such as satellite transmission, radio frequency transmission, cable transmission, and/or via any number of other wired or wireless transmission media. In this example, media server 1110 is shown as an independent component of system 1100 that communicates the program content, program guide data, and advertising content to content provider 1102. In an alternate implementation, media server 1110 can be implemented as a component of content provider 1102.

Content provider 1102 is representative of a headend service in a television-based content distribution system, for example, that provides the program content, program guide data, and advertising content to multiple subscribers (e.g., the television-based client systems 1104(1-N)). The content provider 1102 can be implemented as a satellite operator, a network television operator, a cable operator, and the like to control distribution of program and advertising content, such as movies, television programs, commercials, music, and other audio, video, and/or image content to the client systems 1104(1-N).

Content provider 1102 includes various components to facilitate media data processing and content distribution, such as a subscriber manager 1120, a device monitor 1122, and a content server 1124. The content provider 1102 also includes an operator interface and OSS/BSS APIs to assign the number of data streams to a particular account (e.g., viewing system 104 shown in FIG. 1). The subscriber manager 1120 manages subscriber data, and the device monitor 1122 monitors the client systems 1104(1-N) (e.g., and the subscribers), and maintains monitored client state information.

Although the various managers, servers, and monitors of content provider 1102 (to include the media server 1110 in one embodiment) are illustrated and described as distributed, independent components of content provider 1102, any one or more of the managers, servers, and monitors can be implemented together as a multi-functional component of content provider 1102. Additionally, any one or more of the managers, servers, and monitors described with reference to system 1100 can implement features and embodiments of multi-room user interface.

The television-based client systems 1104(1-N) can be implemented to include a client device 1126 and a display device 1128 (e.g., a television). A client device 1126 of a television-based client system 1104 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 1104(N) is implemented with a computing device 1130 as well as a client device 1126. Additionally, any of the client devices 1126 of a client system 1104 can implement features and embodiments of multi-room user interface as described herein.

Although embodiments of multi-room user interface have been described in language specific to structural features and/or methods, it is to be understood that the subject of the appended claims is not necessarily limited to the specific features or methods described. Rather, the specific features and methods are disclosed as exemplary implementations of multi-room user interface.

The invention claimed is:
1. A system, comprising:
a viewing system that includes a plurality of television-based client devices, at least one of the television-based client devices configured to:
receive from a content provider, a bandwidth-limited digital data stream for carrying multiple individual digital data streams, wherein the multiple individual digital data streams are allocated by the content provider to the viewing system based on a bandwidth available to the viewing system; and
provide, to individual television-based client devices of the plurality of television-based client devices, a selected one of the multiple individual digital data streams; and a multi-room user interface displayed at one of the television based client devices of the viewing system, wherein:
the multi-room user interface is displayed when the viewing system detects a conflict;
the multi-room user interface is configured to:
provide information for any one or more of the television-based client devices of the viewing system;
display representations of viewing selections being shown at two or more of the television-based client devices that receive different data streams, the display representations including at least one picture-in-picture data stream display representation and at least one poster image display representation of an on-demand media content, the on-demand media content representing content not currently available on one of the multiple individual digital data streams; and
allow a viewer to select a conflict solution.

2. A system as recited in claim 1, wherein the multi-room user interface is further configured to display a recording indicator to indicate that a selection at one of the television-based client devices is being recorded and to display a progress bar to indicate a time duration of the recording.

3. A system as recited in claim 1, further comprising a recording system configured to record a viewing selection being shown at one of the television-based client devices, and wherein the multi-room user interface is further configured to indicate a recording conflict between two or more of the television-based client devices.

4. A system as recited in claim 1, wherein the viewing system is implemented in a household and each of the television-based client devices are located in a different viewing area of the household.

5. A system as recited in claim 1, wherein the multi-room user interface is further configured to display recorded selections from which recorded media content can be selected for viewing.

6. A system as recited in claim 1, wherein the multi-room user interface includes a selectable control via which a data stream being directed to one of the television-based client devices can be redirected to another one of the television-based client devices, such that the data stream is no longer directed to the one of the television-based client devices.

7. A system as recited in claim 1, wherein the multi-room user interface is further configured to display a representation of a viewing selection being shown at one of the other television-based client devices in response to the viewing selection being initiated at the other television-based client device.

8. A system as recited in claim 1, wherein the multi-room user interface is further configured to display a progress bar that indicates an amount of a viewing selection that has been delivered for viewing at one or more of the television-based client devices.

9. A method, comprising: receiving at a first television-based client device, selection of a program to be presented, wherein the television-based client device is one of a plurality of television- based client devices that are communicatively connected within a viewing system;
in an event that an available bandwidth between a content provider and the viewing system is sufficient to present the program, presenting the program at the first television-based client device; and
in an event that the available bandwidth is insufficient to present the program, displaying a multi-room user interface at the first television-based client device, the multi-room user interface including information associated with two or more other television-based client devices within the viewing system, wherein the information associated with the two or more other television-based client devices within the viewing system includes at least one picture-in-picture data stream display representation at a second television-based client device of the plurality of television-based client devices and at least one poster image display representation of an on-demand media content at a third television-based client device of the plurality of television-based client devices, the on-demand media content being content not currently available on a channel of the viewing system.

10. A method as recited in claim 9, wherein the information associated with the one or more other television-based client devices within the viewing system includes representations of viewing selections being shown at one or more of the television-based client devices.

11. A method as recited in claim 9, further comprising receiving a selectable input via the multi-room user interface to redirect a data stream being directed to one of the television-based client devices to another one of the television-based client devices.

12. A method as recited in claim 9, wherein the information associated with the two or more other television-based client devices within the viewing system further includes at least one of:
an indication of an amount of time delay when a viewing selection being displayed on one of the other television-based client devices is on a time delay; or
a progress bar on the multi-room user interface that indicates an amount of a viewing selection that has been delivered for viewing at one of the other television-based client devices.

13. A method as recited in claim 9, further comprising unlocking, for viewing at the television-based client device, a viewing selection being presented at one of the other television-based client devices, in an event that the viewing selection exceeds a viewing control limit at the television based client device.

14. A system comprising: a processor; memory communicatively coupled to the processor; and
computer-executable instructions stored in the memory that, when executed by the processor, perform operations comprising:
receiving from a content provider, a bandwidth-limited digital data stream that includes multiple individual digital data streams;
providing, to each of a plurality of television-based client devices, a selected one of the multiple individual digital data streams;
detecting a conflict among the plurality of television-based client devices; and
in response to the detecting:
in an event that at least another of the plurality of television-based client devices is inactive from a lack of user interaction at the other of the television-based client devices, diverting a data stream from the other of the television-based client devices having the inactivity; and
in an event that no other of the plurality of television-based client devices is inactive, displaying a multi-room user interface at a first television-based client device of the plurality of television-based client devices that includes at least one picture-in-picture representation of content being displayed at a second television-based client device of the plurality of television-based client devices and at least one poster image representation of an on-demand media content currently being displayed, or recorded at a third television-based client device of the plurality of television-based client devices, the on-demand media content including content not currently available on one of the multiple individual data streams.

15. A system as recited in claim 14, wherein detecting a conflict among the plurality of television-based client devices comprises:
receiving a request to carry an additional individual digital data stream;
determining that carrying the additional individual digital data stream would exceed available bandwidth of the bandwidth-limited digital data stream.

16. A system as recited in claim 14, wherein detecting a conflict among the plurality of television-based client devices comprises:
receiving a request to carry an additional individual digital data stream;
determining that carrying the additional individual digital data stream would exceed a number of individual digital data streams assigned by the content provider to the plurality of television-based client devices.

17. A system as recited in claim 1, wherein the conflict indicates that there is insufficient available bandwidth from the content provider to the viewing system to receive a requested program.

18. A system as recited in claim 1, wherein in an event that a viewing selection being shown at a television-based client device exceeds a viewing control limit associated with another television-based client device at which the multi-room user interface is displayed, the multi-room user interface is further configured to:
    preempt a display of a representation of the viewing selection of the other television-based client device on the television-based client device; and
    unlock the display of the representation of the viewing selection on the television-based client device in response to receiving user input from one of the other television-based client devices.

19. A system as recited in claim 14, wherein in an event that a viewing selection being shown at a television-based client device exceeds a viewing control limit associated with another television-based client device at which the multi-room user interface is displayed:
    preempting a display of a representation of the viewing selection of the other television-based client device on the television-based client device; and
    unlocking the display of the representation of the viewing selection on the television-based client device in response to receiving user input from one of the other television-based client devices.

20. A method as in claim 9, wherein in an event that a viewing selection being shown at a second television based client device exceeds a viewing control limit associated with the first television-based client device at which the multi-room user interface is displayed:
    preempting a display of the viewing selection of the second television-based client device on the first television-based client device; and
    unlocking the display of the representation of the viewing selection on the first television-based client device in response to receiving user input from one of the other television-based client devices.

* * * * *